(12) United States Patent
Fenchel et al.

(10) Patent No.: US 8,180,151 B2
(45) Date of Patent: May 15, 2012

(54) METHOD FOR SEGMENTING STRUCTURES IN IMAGE DATA RECORDS AND IMAGE PROCESSING UNIT FOR CARRYING OUT THE METHOD

(75) Inventors: Matthias Fenchel, Erlangen (DE); Andreas Schilling, Gomaringen (DE); Stefan Thesen, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 1001 days.

(21) Appl. No.: 12/213,322

(22) Filed: Jun. 18, 2008

(65) Prior Publication Data
US 2008/0317342 A1    Dec. 25, 2008

(30) Foreign Application Priority Data
Jun. 22, 2007   (DE) .................. 10 2007 028 895

(51) Int. Cl.
*G06K 9/34*   (2006.01)
(52) U.S. Cl. ....................... 382/173; 382/128
(58) Field of Classification Search .......... 382/128–132, 382/173–180
See application file for complete search history.

(56) References Cited

U.S. PATENT DOCUMENTS

| | | | |
|---|---|---|---|
| 5,903,664 A | | 5/1999 | Hartley et al. |
| 6,078,688 A | | 6/2000 | Cox et al. |
| 7,043,290 B2 * | | 5/2006 | Young et al. .................. 600/416 |
| 7,596,267 B2 * | | 9/2009 | Accomazzi et al. ........... 382/173 |
| 7,692,664 B2 * | | 4/2010 | Weiss et al. ................... 345/592 |
| 2003/0053667 A1 * | | 3/2003 | Paragios et al. ............... 382/128 |
| 2004/0008886 A1 | | 1/2004 | Boykov |
| 2005/0281381 A1 | | 12/2005 | Guendel |
| 2006/0034511 A1 | | 2/2006 | Verstraelen et al. |
| 2006/0177133 A1 * | | 8/2006 | Kee ................................ 382/173 |
| 2006/0285747 A1 * | | 12/2006 | Blake et al. ................... 382/180 |
| 2007/0165949 A1 * | | 7/2007 | Sinop et al. ................... 382/173 |

(Continued)

FOREIGN PATENT DOCUMENTS
DE    197 46 936    5/1998
(Continued)

OTHER PUBLICATIONS

X. Munoz, J. Freixenet, X. Cufi, J. Marti: Strategies for image segmentation combining region and boundary information; in: Pattern Recognition Letters 24 (2003) 375-392; Institute of Informatics, University of Girona, Spain.; Others.

(Continued)

*Primary Examiner* — Jingge Wu
(74) *Attorney, Agent, or Firm* — Harness, Dickey & Pierce, P.L.C.

(57) ABSTRACT

In the method according to at least one embodiment of the invention, a first segmentation of a structure in an image data record is firstly carried out, and a first final segmentation result is obtained therefrom. A region in the image data record is selected based on the first final segmentation result obtained. A first band is placed at a first, outwardly pointing distance from the selected region. This first band characterizes a background region. A second band is placed at a second, inwardly pointing distance from the projected first final segmentation result of the first segmentation. This second band characterizes a structure region. A further segmentation is carried out based on the characterized background region and the characterized structure region, and the final segmentation result of the further segmentation is saved and/or displayed. Furthermore, an image processing unit for carrying out the method is disclosed.

14 Claims, 3 Drawing Sheets

U.S. PATENT DOCUMENTS

| | | | |
|---|---|---|---|
| 2009/0003699 A1* | 1/2009 | Dugan et al. | 382/173 |
| 2009/0060333 A1* | 3/2009 | Singaraju et al. | 382/173 |
| 2009/0180692 A1* | 7/2009 | Sheasby et al. | 382/173 |
| 2010/0272357 A1* | 10/2010 | Maxwell et al. | 382/173 |

FOREIGN PATENT DOCUMENTS

| | | |
|---|---|---|
| DE | 102004027710 | 1/2006 |
| DE | 10 2005 029 6 | 3/2006 |

OTHER PUBLICATIONS

German Office Action issued Feb. 14, 2008.

Barrett, W.A., Mortensen, E.N.; Interactive Live-Wire Boundary Extraction; Medical Image Analysis, vol. 1, No. 4, pp. 331-341. CVPR'99 #107 p. 6/7; Others; 1997.

German Office Action, Mar. 13, 2009.

* cited by examiner

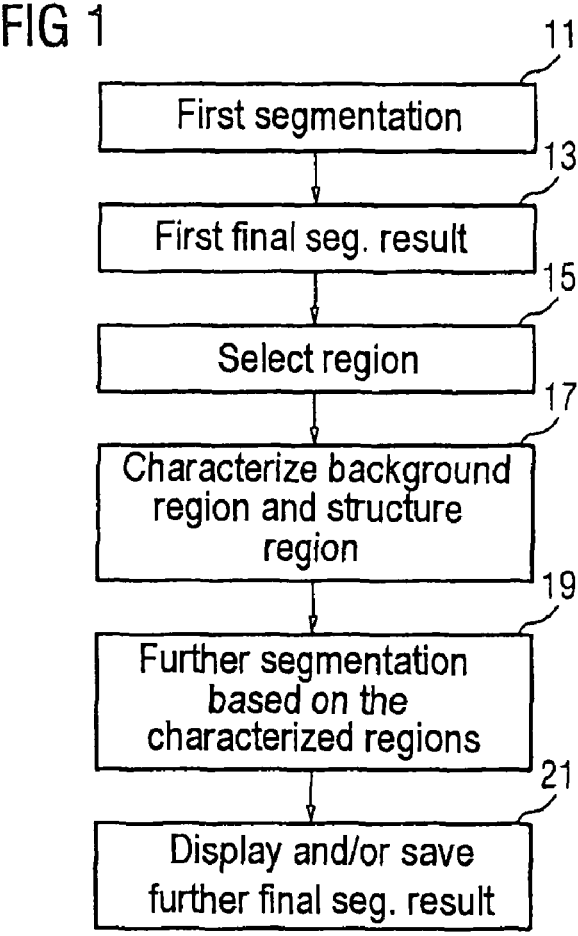
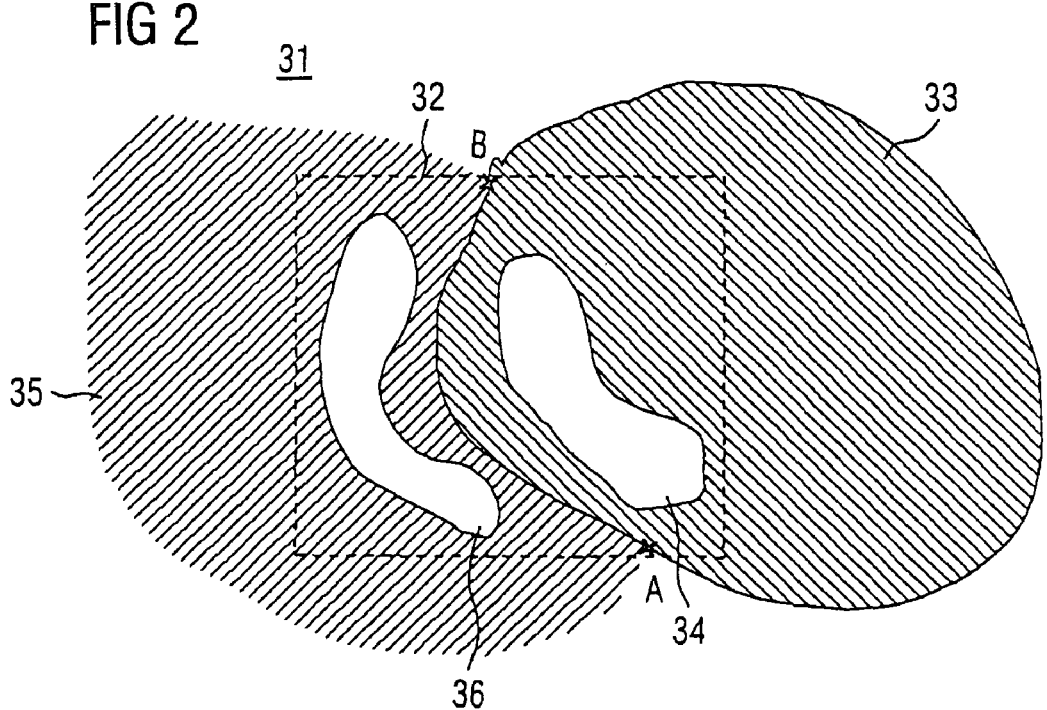

METHOD FOR SEGMENTING STRUCTURES IN IMAGE DATA RECORDS AND IMAGE PROCESSING UNIT FOR CARRYING OUT THE METHOD

PRIORITY STATEMENT

The present application hereby claims priority under 35 U.S.C. §119 on German patent application number DE 10 2007 028 895.8 filed Jun. 22, 2007, the entire contents of which is hereby incorporated herein by reference.

FIELD

Embodiments of the invention generally relate to a method for segmenting structures in image data records and/or to an image processing unit for carrying out the method.

BACKGROUND

Segmenting anatomical structures is an important part of the analysis of image data, in particular of medical image data as well. Important examples are the planning of surgical procedures, volumetric examinations of organs, evaluating the progression of metastases, or the statistical modeling of organs.

In this case, image information about a three-dimensional (3D) structure is usually present as a sequence of two-dimensional (2D) scan slices of an imaging modality, such as, for example, computed tomography (CT) or magnetic resonance imaging (MRI). For this reason, it is conventional that the desired structure must firstly be segmented in the individual scan slices before it can be composed to form a 3D structure. However, segmentation algorithms for directly segmenting 3D structures are already available as well.

A fully automatic segmentation of medical image data is barely possible to implement using current technology. For this reason it is inevitable that a user must be able to independently intervene during the segmentation. Depending on the segmentation algorithm used, the user intervenes in different ways in the segmentation in order to control the result in the desired manner.

Diverse algorithms for interactive segmentation exist. Here, inter alia, two different main groups can be distinguished: contour-based segmentation algorithms and region-based segmentation algorithms.

As an exemplary contour-based segmentation algorithm, the so-called livewire method will be discussed briefly here. This method has become established as a qualitatively high-grade interactive segmentation of organ structures from 3D data records. It is very reliable, particularly in the case of high image contrasts. However, in the case of weak image contrasts an extremely large number of interventions by the user is often required to achieve an acceptable result.

The basic concept of the livewire method is the following: a user marks a starting point on the contour of the structure in a displayed image data record, for example by way of a cursor and a mouse, and then moves the cursor to another position in the image data record. The livewire algorithm calculates the course of the contour from the starting point to the current position of the cursor. For this purpose, a so-called cost function is used which allows a path to be calculated which satisfies certain criteria in an optimum manner, such as, for example, minimum change of the value of the gradient along the path. Should the calculated path not lie correctly on the contour of the structure, the user can take corrective action, for example by simply clicking on and displacing the path.

More details are described, for example, in W. A. Barret and E. N. Mortensen (1997) "Interactive Livewire Boundary Extraction", Medical Image Analysis, Vol. 1, No. 4, pp. 331341, CVPR '99 #107 page 6/7.

As an example of a region-based segmentation algorithm, the so-called GraphCut method will be discussed briefly here. This method too has become established as qualitatively high-grade and achieves a good result even in the case of weak image contrasts. In the GraphCut method, the user characterizes such image regions which are located within the structure and such image regions which are located outside of the structure. The GraphCut algorithm calculates the maximum discontinuity between these regions, again using a cost function as a criterion which comprises, for example, gray scale information in the characterized regions. This maximum discontinuity corresponds to the border of the structure. If the result is not yet satisfactory after a first segmentation, further inner and outer regions can be marked until an acceptable segmentation result is present. A more detailed description of a GraphCut algorithm and an associated cost function are disclosed in US 2004/0008886 A1, for example.

By way of such segmentation algorithms, the user works through a given 3D image data record slice by slice until the entire structure is segmented. Depending on the segmentation algorithm used and the image contrasts present in each case, the user can often be forced to intervene, which can significantly increase the processing time of a 3D image data record.

Therefore, there is still the need for user-friendly segmentation algorithms which allow rapid segmentation of structures in a manner which is as intuitive as possible and requires little interaction.

SUMMARY

In at least one embodiment of the invention, a method is provided for segmentation which limits the required interaction of a user with the segmentation method to a few intuitive operating steps which allow an effective operation.

In the case of the method according to at least one embodiment of the invention, a first segmentation of a structure in an image data record is first of all carried out and a first final segmentation result is obtained therefrom. The segmentation result can be either an isocontour, that is to say a one-dimensional manifold, in the case of a 2D slice, or an isosurface, that is to say a 2-dimensional manifold, in the case of a 3D data record. In the following text, the method is described independently of the dimensionality.

A region in the image data record is selected based on the first final segmentation result obtained. A first band is placed at a first, outwardly pointing distance d1 from the selected region. This first band characterizes a background region.

A band is here understood to mean a parallel isocontour (or one-dimensional manifold) or an isosurface (or two-dimensional manifold), depending on the dimensionality.

A second band is placed at a second, inwardly pointing distance d2 from the selected region. This second band characterizes a structure region. A further segmentation is carried out based on the characterized background region and the characterized structure region, and the final segmentation result of the further segmentation is saved and/or displayed. The terms "inwardly" and "outwardly" thus refer to "within" or "outside of" the structure to be segmented.

The bands are placed automatically by the segmentation program based on the distances d1 and d2 and the band widths of the first and the second band, which are prescribed corresponding to the conditions of the image data record. The width of a band is usually between one and 20 pixels, or more, depending on the resolution and image conditions. The distances are selected depending on the situation. In general, the distances are likewise a few pixels, e.g. 3 to 5.

The method according to least one embodiment of the invention considerably eases segmenting structures and reduces the number of required interactions by the user since an initialization of a further segmentation is carried out automatically. The further segmentation completes the segmentation.

The method according to least one embodiment of the invention can advantageously be used in different situations during a segmentation of a 3D image data record.

On the one hand, it is advantageous in the case of a slice-by-slice segmentation of a 3D image data record. In this case, the final segmentation result of a first segmentation in a first slice of the 3D image data record is projected onto a second slice of the 3D image data record which neighbors the first slice. The projection selects a region in the second slice around which—or in which—the bands are placed.

By way of the automatic characterization of background and structure regions in the second slice neighboring the first slice, a segmentation can be carried out there in a quick fashion and with almost no further user interaction, for example by using the GraphCut method. This allows a slice-by-slice segmentation of a 3D image data record in a short period of time. This procedure is called "ribbon method" in the following description.

On the other hand, a surface of a 3D structure composed of final segmentation results of a plurality of slices can be improved in a simple manner. For this purpose, the surface of the 3D structure, composed of segmentation results of a slice-by-slice segmentation, is considered to be a two-dimensional surface manifold as a first final segmentation result and is selected as the region around which—or in which—a first and a second band are placed in the manner specified above.

The segmentation initialized by this method, for example the GraphCut method, provides the maximum discontinuity between "within" and "outside of" the 3D structure and thus provides a corrected, smoothed surface. This procedure is called "ribbon method 3D" in the following description.

BRIEF DESCRIPTION OF THE DRAWINGS

Further advantages and details of the present invention emerge from the example embodiments described below, which do not limit the invention in any way, and from the drawings, in which FIG. 1 shows a schematic flow chart of the method according to an embodiment of the invention, FIG. 2 shows possibilities of segmentation using a very simplified example of a structure to be segmented in a 2D image data record.

DETAILED DESCRIPTION OF THE EXAMPLE EMBODIMENTS

Figure 3:
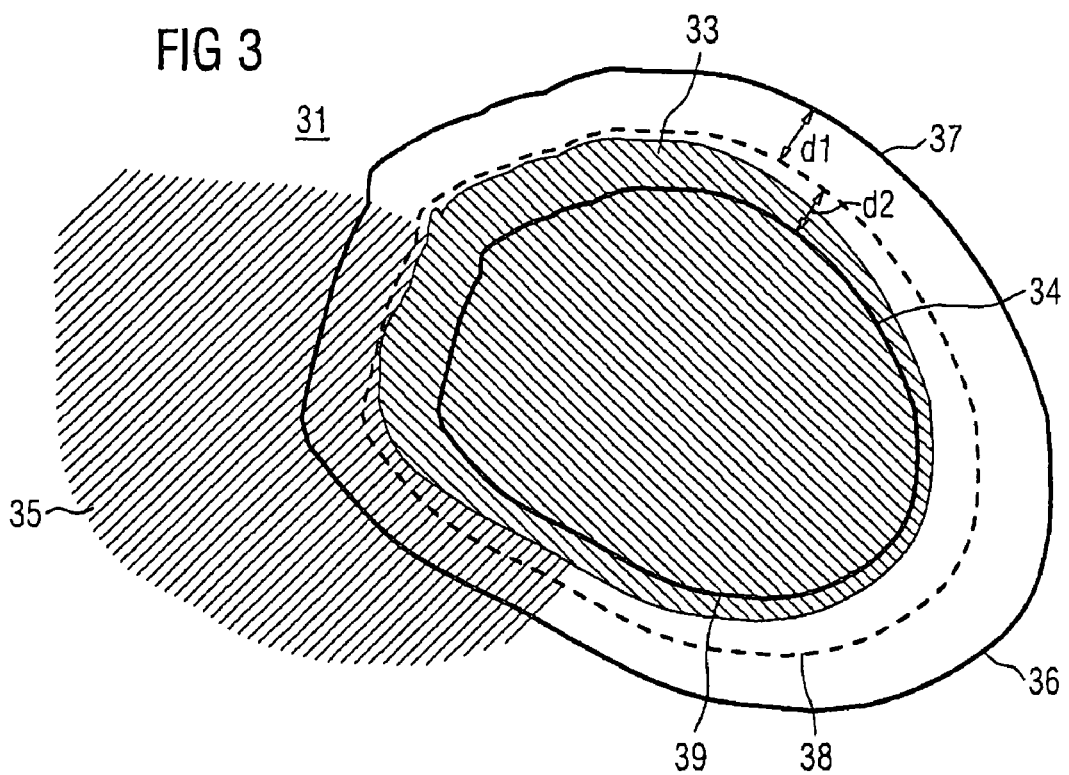
FIG. 3 shows an illustration of the method according to an embodiment of the invention using the example from FIG. 2.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the, " are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 schematically shows a block diagram which illustrates the progression of the method according to an embodiment of the invention. In this case a first segmentation in an image data record is carried out (block 11) in order to obtain (block 13) a first final segmentation result (abbreviated to final seg. result).

A region in the image data record is selected (block 15) based on the first final segmentation result obtained. A first and a second band are placed around the selected region in order to characterize (block 17) a background region and a structure region. A further segmentation is carried out (block 19) based on the characterized regions. Finally, the final segmentation result of the further segmentation is displayed and/or saved (block 21). The method is explained in more detail further below, in particular with reference to FIG. 3 and FIG. 4.

FIG. 2 illustrates a very simplified image data record 31 having a structure 33 to be segmented and a further structure 35.

The structure 33 is represented by the shaded surface with lines running from bottom left to top right. The further structure 35 is represented by the shaded surface with lines running from top left to bottom right. The background is illustrated in white for the sake of clarity. The contrast between the two structures 33 and 35 is only weak. On the other hand, the contrast between the structures 33 or 35 and the background is strong.

The points A and B mark points which are adjoined by both the structure 33 and the further structure 35, and by the background as well.

In order to segment the structure 33, a user can either select a single segmentation algorithm for the entire segmentation, or the user has the advantageous possibility of editing an image data record with different segmentation algorithms in certain areas, as described in the following.

If the user has selected a region-based segmentation algorithm in order to, for example, segment the structure 33 in that region in which it adjoins the further structure 35, the user marks a rectangular region 32 (dashed line), as illustrated by way of example, within which the border between the structures 33 and 35 lies. This can be carried out in a usual manner with the aid of an input device, which comprises a mouse for example, for example after selecting a rectangular selection tool as the cursor.

In order to initialize the region-based segmentation algorithm, for example a GraphCut algorithm, the user furthermore marks a region 34, within the structure 33 to segmented, as the structure region 34 belonging to the structure 33, and marks a region 36 outside of the structure as a background region 36, with everything which does not count as part of the structure 33 to be segmented being referred to as background in this context. This in turn is carried out with the aid of the input device, wherein other known selection tools can also be available as a cursor.

The initialized region-based segmentation algorithm now segments the structure 33 in the selected region 32 which is bordered by the dashed white lines in the illustration. If the segmentation result in the marked region 32 is not yet satisfactory, the user can characterize further regions as structure regions or background regions until a desired segmentation is present in the region 32. In this example, the solid black line between the structures 33 and 35, which line runs clockwise from point A to point B, is displayed as the segmentation result of this segmentation.

In order to further segment the structure 33 to be segmented, the user now selects a contour-based segmentation algorithm for example, e.g. a livewire algorithm. To mark the region to be segmented, the user simply clicks on a starting point on a contour of the structure 33 to be segmented, e.g. on point B, and moves the cursor further along the structure 33, in this case clockwise, for example.

In this case, a segmentation result from the starting point B to the position of the cursor is always calculated and displayed. During the segmentation using the contour-based segmentation algorithm, the user can mark further points on the desired contour as fixed points for the segmentation algorithm.

The user continues this until an end point, for example point A, is reached. There the user completes the marking of the region to be segmented and, at the same time, the segmentation using the contour-based segmentation algorithm, for example by double-clicking or clicking with another mouse button. The segmentation result of this segmentation is illustrated in this example by the solid black line which runs clockwise from point B to point A.

If the user is not yet satisfied with the respective segmentation results, a segmentation algorithm can be selected anew in order to segment regions again in corrective fashion in which the structure 33 has not yet been segmented satisfactorily. Here the user can fall back on a manual segmentation. Furthermore, in this case, the user can also segment already segmented regions again, possibly with a different segmentation algorithm. Furthermore, already known corrective means, such as, for example, the so-called "path cooling" in the case of livewire methods, are also available.

If the user is satisfied with the segmentation results achieved and the structure 33 has been completely segmented, then the segmentation results achieved can be saved as the final segmentation result of the displayed slice.

FIG. 3 clarifies the method according to an embodiment of the invention, the so-called "ribbon method", by using the exemplary image data record 31 of FIG. 2 with the structure 33 to be segmented and the further structure 35.

A segmentation result 38 of a neighboring slice is projected onto the image data record 31 and a region is selected in this manner. A first band 37 is placed at a first, outwardly pointing distance dl from the projected final segmentation result of the neighboring slice 38. Here, this first band characterizes a background region 36.

A second band 39 is placed at a second, inwardly pointing distance d2 from the projected final segmentation result of the neighboring slice 38. Here, this second band characterizes a structure region 34.

The distances d1 and d2, and also the width of the first and of the second band 37 and 39, are appropriately prescribed.

After this automatic initialization of a region-based segmentation algorithm, the user can continue segmenting the structure 33 as described above.

This method significantly eases slice-by-slice segmenting of a structure in a 3D image data record, since a manual initialization has been dispensed with. In this manner, a user can very quickly work through many slices of a multi-slice 3D image data record.

If a structure in a slice disintegrates into a plurality of parts, the individual parts are in each case segmented and can thereupon be unified as a coherent element, for example by means of constructive solid geometry (CSG). Such methods are known as "split" and "merge" methods, for example.

Figure 4:
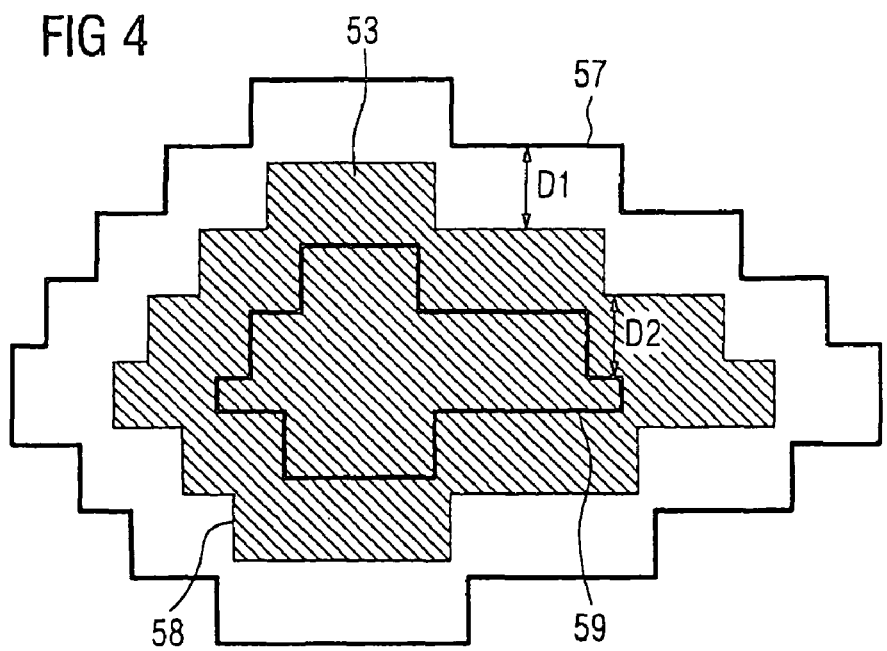
FIG. 4 shows a schematic illustration of a section through a composed 3D structure after complete segmentation of all relevant slices.

A section through a 3D structure 53 composed of six individually segmented slices is schematically illustrated in FIG. 4 by the hatched surface. The solid black line 58, which delimits the composed 3D structure, is generated by composing the final segmentation results of the individual slices and the edges of the slices. The line 58 thus represents a section through the composed surface and thus the region of the structure 53 selected here.

To exemplify the "ribbon method 3d", the associated section through a first band 57, which is placed at an outwardly pointing distance D1 and characterizes a background region, is also illustrated. Analogously the section also contains a second band 59, which is placed at an inwardly pointing distance D2.

Again, the distances D1 and D2, and also the width of the first and of the second band 57 and 59, are appropriately prescribed.

With the aid of a region-based segmentation algorithm, for example using the GraphCut method, the two-dimensional surface manifold of the composed structure 53 can once again be segmented based on the characterized regions. This segmentation provides the maximum discontinuity between "within" and "outside of" in the 3D image data record and thus provides a corrected surface of the 3D structure to be segmented.

Figure 5:
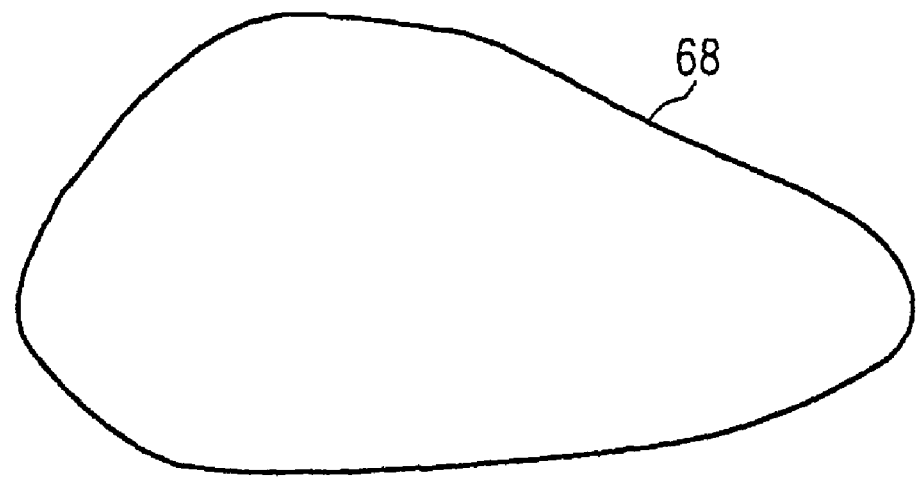
FIG. 5 shows a segmented 3D structure after post-processing.

FIG. 5 schematically shows the section through the 3D structure of FIG. 4 after segmentation and further sufficiently known post-processing steps, such as, for example, smoothing and anti-aliasing. A smooth surface 68 is obtained.

Figure 6:
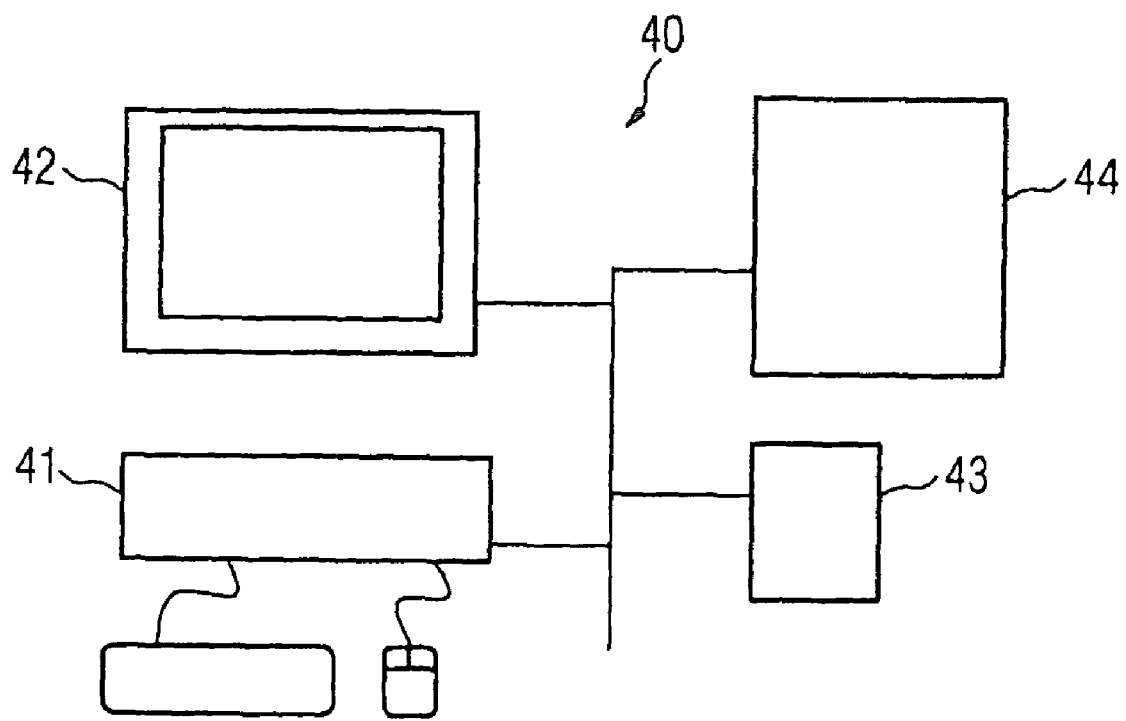
FIG. 6 shows a schematic illustration of an image processing unit for carrying out the method according to an embodiment of the invention.

Finally, FIG. 6 shows a schematic illustration of an image processing unit 40 for carrying out the method according to an embodiment of the invention.

The image processing unit 40 includes an input device 41 for entering commands, for example by means of a mouse or a keyboard, display equipment 42 for displaying image data records, a memory unit 43 for saving and loading image data records and a computational device 44 for carrying out calculations.

A group of segmentation algorithms which are functionally linked to one another in accordance with an embodiment of the invention is implemented on the image processing unit 40.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for segmenting a structure in an image data record, comprising:
   carrying out a first segmentation of the structure in the image data record;
   obtaining a first final segmentation result from the first segmentation;
   selecting a region in the image data record based on the first final segmentation result;
   characterizing a background region by placing a first band at a first, outwardly pointing distance from the selected region;
   characterizing a structure region by placing a second band at a second, inwardly pointing distance from the selected region,
   carrying out a further segmentation based on the characterized background region and the characterized structure region;
   at least one of displaying and saving a final segmentation result of the further segmentation.

2. The method as claimed in claim 1, wherein the further segmentation is carried out with a region-based algorithm.

3. The method as claimed in claim 1, wherein at least one of the first and second band have a width.

4. The method as claimed in claim 1, wherein the image data record is a 3D image data record, the first segmentation is carried out in a first slice of the 3D image data record, and the region which is selected based on the first final segmentation result is selected in a second slice which neighbors the first slice.

5. The method as claimed in claim 4, wherein the selected region is a projection of the first final segmentation result onto the second slice.

6. The method as claimed in claim 5, wherein the image data record is a 3D image data record, the first segmentation is a slice-by-slice segmentation of a structure in the 3D image data record, and the first segmentation result is the surface of the structure composed of segmentation results of a slice-by-slice segmentation.

7. The method as claimed in claim 6, wherein the selected region is the composed surface of the structure in the 3D image data record.

8. An image processing unit, comprising:
- an input device configured to enter commands;
- display equipment configured to display image data records;
- a memory unit configured to save and load image data records; and
- a computational device configured to carry out the method according to claim 1.

9. The method as claimed in claim 2, wherein at least one of the first and second band have a width.

10. The method as claimed in claim 2, wherein the image data record is a 3D image data record, the first segmentation is carried out in a first slice of the 3D image data record, and the region which is selected based on the first final segmentation result is selected in a second slice which neighbors the first slice.

11. The method as claimed in claim 3, wherein the image data record is a 3D image data record, the first segmentation is carried out in a first slice of the 3D image data record, and the region which is selected based on the first final segmentation result is selected in a second slice which neighbors the first slice.

12. The method as claimed in claim 9, wherein the image data record is a 3D image data record, the first segmentation is carried out in a first slice of the 3D image data record, and the region which is selected based on the first final segmentation result is selected in a second slice which neighbors the first slice.

13. A computer readable medium including program segments for, when executed on a computer device, causing the computer device to implement the method of claim 1.

14. An image processing unit, comprising:
- means for carrying out a first segmentation of a structure in an image data record;
- means for obtaining a first final segmentation result from the first segmentation;
- means for selecting a region in the image data record based on the first final segmentation result;
- means for characterizing a background region by placing a first band at a first, outwardly pointing distance from the selected region;
- means for characterizing a structure region by placing a second band at a second, inwardly pointing distance from the selected region,
- means for carrying out a further segmentation based on the characterized background region and the characterized structure region;
- means for at least one of displaying and saving a final segmentation result of the further segmentation.

* * * * *